(12) United States Patent
Betzl

(10) Patent No.: US 6,443,519 B1
(45) Date of Patent: Sep. 3, 2002

(54) SEALING SYSTEM ON A MOTOR VEHICLE

(75) Inventor: Thomas Betzl, Andechs (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/661,366

(22) Filed: Sep. 13, 2000

(30) Foreign Application Priority Data

Sep. 13, 1999 (DE) .......................... 199 43 765

(51) Int. Cl.[7] .............. B60J 10/08; B60J 7/00; B60R 13/07; B62D 25/07
(52) U.S. Cl. .............. 296/216; 296/146.9; 296/154
(58) Field of Search .............. 296/213, 146.9, 296/154

(56) References Cited

U.S. PATENT DOCUMENTS

| | | | | |
|---|---|---|---|---|
| 3,944,278 A | * | 3/1976 | Takahashi et al. | 296/146.9 |
| 4,475,766 A | * | 10/1984 | McKee | 296/213 |
| 4,494,790 A | * | 1/1985 | Omura | 296/154 |
| 4,582,358 A | * | 4/1986 | Draper | 296/213 |
| 4,688,847 A | * | 8/1987 | Freudenberg | 296/146 |
| 4,729,593 A | * | 3/1988 | Nisiguchi et al. | 296/154 |
| 4,775,181 A | * | 10/1988 | Shoda | 296/213 |
| 4,817,336 A | * | 4/1989 | Kisanuki | 296/154 |
| 5,209,546 A | * | 5/1993 | Hasegawa et al. | 296/213 |
| 5,466,038 A | * | 11/1995 | Fujie et al. | 296/213 |
| 5,664,827 A | * | 9/1997 | Mori et al. | 296/213 |
| 5,902,008 A | * | 5/1999 | Butsuen et al. | 296/213 |
| 5,941,598 A | * | 8/1999 | Cave et al. | 296/213 |
| 6,196,625 B1 | * | 3/2001 | Nagashima et al. | 296/213 |
| 6,270,154 B1 | * | 8/2001 | Farber | 296/213 |

FOREIGN PATENT DOCUMENTS

| | | | | |
|---|---|---|---|---|
| DE | 3910257 | * | 3/1990 | 296/213 |
| DE | 3940503 | * | 12/1990 | 296/218 |
| DE | 43 44 373 | | 1/1995 | |
| DE | 195 02 325 | | 8/1996 | |
| DE | 194 41 848 | | 5/1997 | |
| EP | 460768 | * | 12/1991 | 296/213 |
| GB | 430479 | * | 6/1935 | 296/213 |

* cited by examiner

Primary Examiner—Stephen T. Gordon
Assistant Examiner—H. Gutman
(74) Attorney, Agent, or Firm—Nixon Peabody LLP; David S. Safran

(57) ABSTRACT

A sealing system on a motor vehicle is disclosed which includes two sealing profile sections on two adjacent body parts and in which each of the two sealing profile sections can be moved relative to one another. In addition, each of the two sealing profile sections has at least one channel for carrying water that at least partially overlap when the body parts are adjoined to one another.

11 Claims, 5 Drawing Sheets

SEALING SYSTEM ON A MOTOR VEHICLE

BACKGROUND OF THE INVENTION

1. Field of the Invention

The invention relates to a sealing system on a motor vehicle with two sealing profile sections on two adjacent body parts, which can be moved relative to one another.

2. Description of Related Art

Conventional sealing systems of motor vehicle parts consist generally of peripheral hollow chamber seals which are positioned against the adjacent body part with their closed outer surfaces. Water which penetrates into the sealing gap is conventionally drained down in sheet metal lock seams on the body parts. When the body parts are moved the water which has collected in the sealing gaps can penetrate into the motor vehicle interior.

SUMMARY OF THE INVENTION

The primary object of the present invention is to devise a sealing system which has an improved sealing and water drainage function. In an exemplary embodiment of the present invention, each of the adjacent sealing profile sections has at least one channel for carrying water, these water-carrying channels of the sealing profile sections at least partially overlap when the body parts adjoin one another. The water can pass unhindered from one channel into the adjacent channel due to the sealing profile sections tightly adjoining in the overlapping areas.

In a preferred embodiment, the overlapping areas are located in an area which is inclined relative to the horizontal. This arrangement of the joints or overlapping areas prevents water from remaining in these areas and thus from being able to penetrate into the gaps of the overlapping areas as a result of capillary action. Preferably, at least on of the two channels has an open cross section which is preferably opened to the top to collect rain water and wash water and which forms a type of gutter.

According to another advantageous embodiment, it is provided that at least one of the two channels has a closed cross section. Here they are especially channels which have a highly vertical component in their alignment. Open or closed channels of adjacent sealing profile sections can be inserted into these closed channels by overlapping transfer sections.

It is advantageous for easy, independent insertion of the adjacent sealing profile sections into one another if one of the two channels in the overlapping area has a cross section which is reduced relative to the cross section of the adjacent channel. In this way the channels can be tightly inserted into one another with the corresponding matching of their dimensions. In particular, when the channels are inserted into those channels with a closed cross section it is advantageous if the overlapping section of the channel which has been inserted into the closed sealing profile section has an end area which uniformly tapers conically towards its end.

It is furthermore advantageous if a sealing profile section on a drain point which is suitable for this purpose towards the body has at least one defined water discharge area. This makes it possible to drain the collected water at suitable points onto the body so that not all the rain water which has been held by the sealing system need be routed to the lowermost point of a hose-shaped sealing system. For this drainage of residual water in a closed cross section at the lowest point there is advantageously a hole which penetrates the wall of this channel. This hole can for example be located at the lowest point of the lower door seal. One preferred application of the sealing system arises for a movable side member of a convertible-like motor vehicle roof system in which at least one sealing profile section is located on this side member which can be either completely removable or can be made to swivel and the adjacent sealing profile section is located on one of the adjacent columns, such as the A column or B column.

Another advantageous application arises in the overlapping area of a sealing profile section which is located on the bottom of a movable side member with an adjacent sealing profile section on one door of the motor vehicle.

In the following, embodiments of the invention are explained with reference to the drawings.

DETAILED DESCRIPTION OF THE PREFERRED EMBODIMENT

Figure 1:
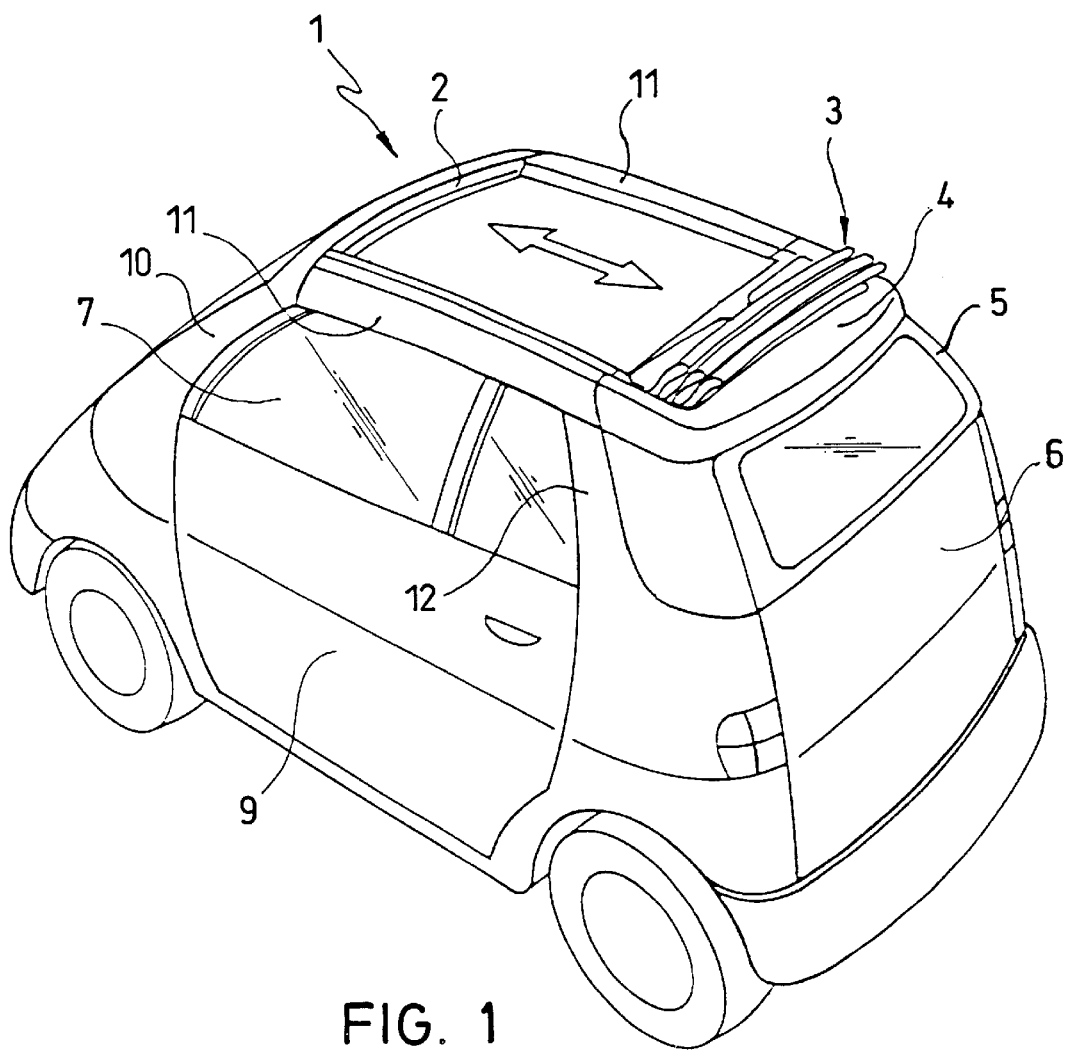
FIG. 1 is a schematic perspective view of a motor vehicle with a convertible motor vehicle roof.

As illustrated in FIG. 1, the motor vehicle I has a vehicle roof which can be opened in several component steps. The apron 2 which connects to the top of the front windshield is adjoined to the rear by a folding soft top 3 which can be opened as far as the completely open position which is shown. In the completely open position, the folding soft top 3 is held completely in a rear roof cassette 4 which is adjoined below and to the rear by a rear soft top 5. The rear soft top 5 is joined to the rear hatch 6 with a bottom clamp clip (not shown). Between the apron 2 and the roof cassette 4 to either side there extend side members 11 on which there are guide rails (not shown) for the sliding of the folding soft top 3. The side members 11 are detachably mounted with their front end on the front columns 10 and with their back end on the rear columns 12. Situated between the front columns 10 and the rear columns 12 are doors 9 which have a displaceable side window 7 having a top edge that fits tightly to seal the side member 11.

After the folding soft top 3 has been moved completely into the roof cassette 4, the side members 11 can be unlocked relative to the rear columns 12 and after slipping out of the front bearings on the front columns 10 can be stowed in a stowage space on the inside of the rear hatch 6. The roof cassette 4 is supported on a four-bar mechanism (not shown) on either side in the rear area on the body of the motor vehicle and after unlocking relative to the rear column 12 together with the folding soft top 3 which is held in it and the rear soft top 5 which is being folded together can be stored in a stowage space in the top part of a trunk space which is covered by the rear hatch 6.

Because the side member 11 is removable, a sealing problem arises which in motor vehicles in the past did not occur in this way. The side members 11 must on the one hand have a seal relative to the folding soft top 3; but on the other hand they must be sealed on their front end relative to the apron 2 and the front column 10 to the bottom relative to the side window 7 and to the rear relative to the roof cassette 4 and the rear column 12. For this purpose, the side member 11 has a top side member seal 13 having a front end section 13A that interacts with an apron seal 22 and the front column seal 14. In its rear end section 13B, the top side member seal 13 interacts with a roof cassette seal 17 which adjoins rear and bottom sides of the top side member seal 13 as does the rear column seal 18. In their lower outer edge the side members 11 have a lower or bottom side member seal 16A and 16B, the front portion 16A of this bottom side member seal in the front area interacting with a front obliquely running section 15A of a door seal 15 and the front column seal 14. The rear portion 16B of the lower side member seal interacts to the bottom with a rear vertical section 15D of the door seal 15 and to the rear with a seal molding 25 on the rear columns 12.

The bottom side member seal 16B is connected at its rear portion to the column seal 18 which discharges water from the top toward the bottom via the seal molding 25 with a rear soft top seal 19. This in turn adjoins at its back end a horizontally running top rear hatch sea 20, whereupon the two discharge into a bottom rear hatch seal 21.

The primarily vertically running seals, such as the front column seal 14, the door seal 15 with its sealing sections 15A, 15B, 15C and 15D, the rear soft top seal 19, and the top rear hatch seal 20, and the bottom rear hatch seal 21 are made as hollow sections with an inside water-carrying channel. At the lowest point of the horizontal bottom section 15C of the door seal 15 and on the lowest point of the bottom rear hatch seal 21 there is one hole 23 and 24 each which are used to drain rain water and wash water which has penetrated into the sealing system.

Figure 3:
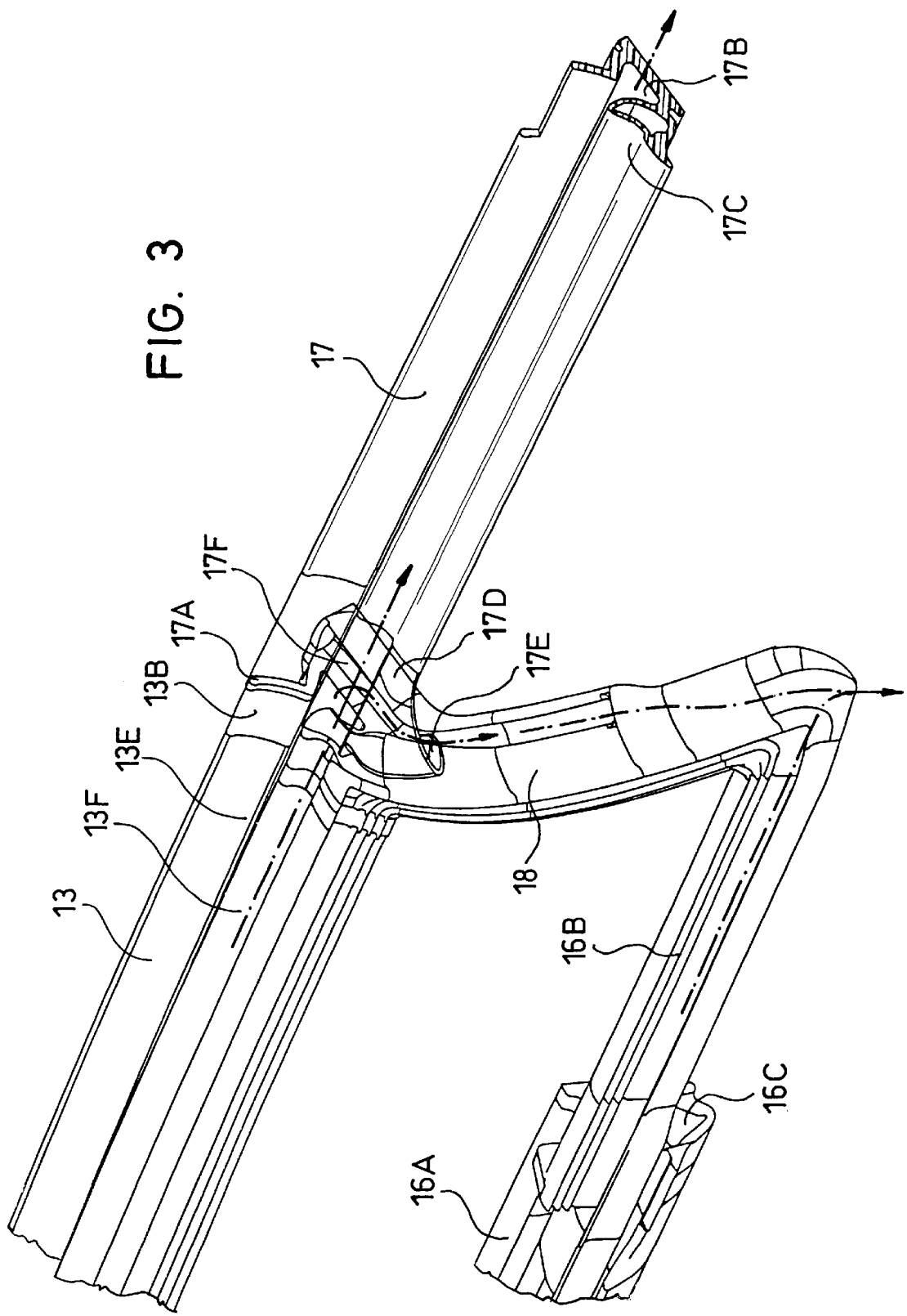
FIG. 3 shows the transition area from the side member to the roof cassette or to the B-column.
Figure 4:
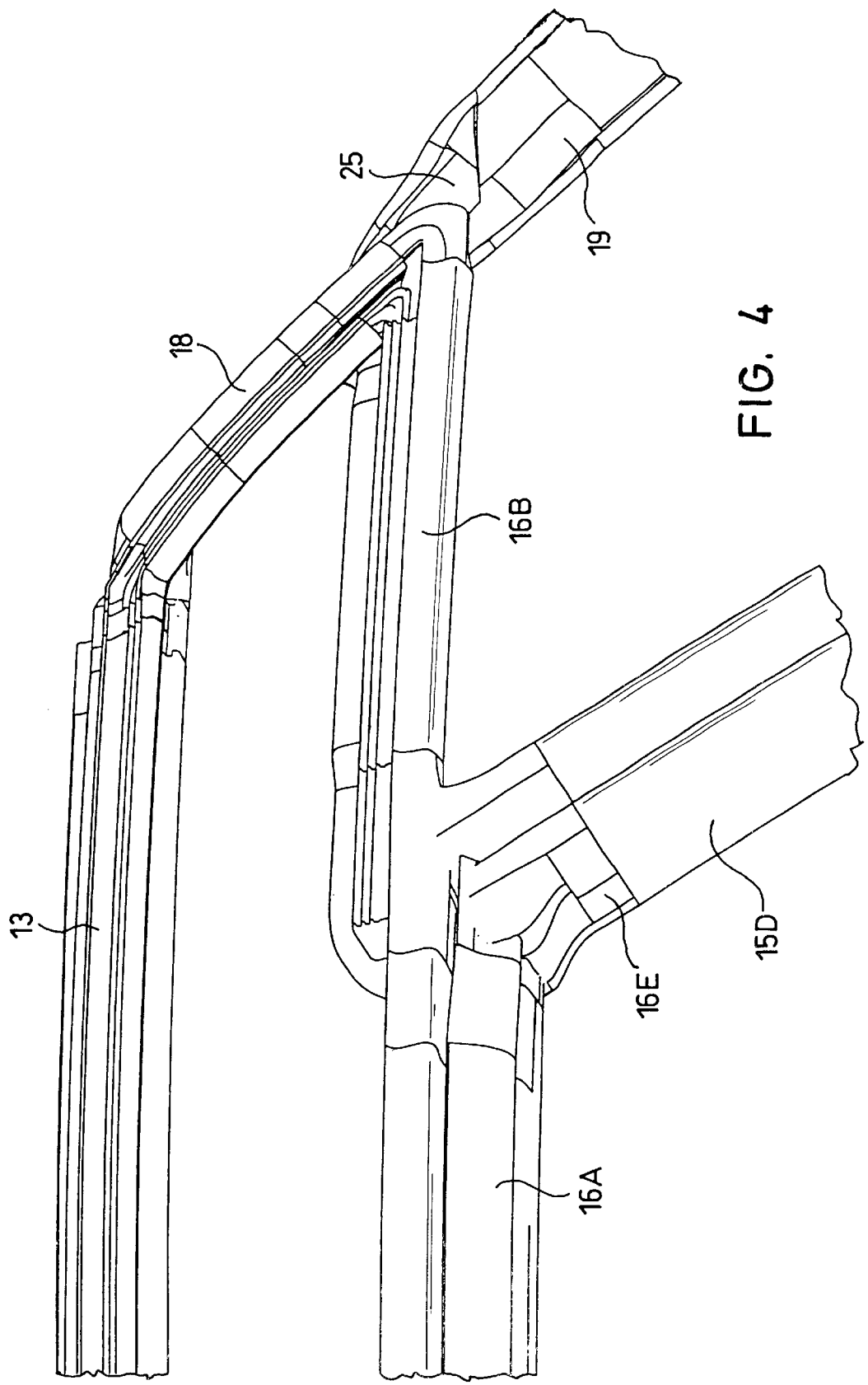
FIG. 4 is a perspective view of the transition area from the side member to the door seal.

To transfer the water reliably from one sealing profile section into the adjacent sealing profile section, it is provided that these adjacent sealing profile sections partially overlap, at least in the area of the water-carrying channels. In FIG. 3, examples of these overlaps of the rear end section 13B of the top side member seal 13 and the roof cassette seal 17 are shown with their front end section 17A. When the side member 11 is inserted the rear end section 13B of the top side member seal 13 lies on the front end section 17A of the roof cassette seal 17 to form a seal. The profile of the top side member seal 13 is similar to the profile of the roof cassette seal 17 which is shown on the right lower end of FIG. 3. It has an outside primary sealing lip 17C against which the outside edge of the folding soft top 3 in the closed state is positioned, forming a seal from the top. But if water should pass the primary sealing lip 17C, for example water in a car-wash under high pressure sideways to the inside, the overflowing secondary water is collected in a water channel 17B which is open to the top and is routed to the rear. The top side member seal 13 also has one such channel.

In the overlapping area, therefore, the rear end section 13B of the top side member seal 13 lies above the front end section 17A of the roof cassette seal 17. This area has a slight gradient to the rear so that it is relatively improbable that water from the channel 17B will run back in the forward direction to the side member seal 13. Since this however could occur in an unfavorable position of the motor vehicle (driving on an incline), in the front end section 17A of the roof cassette seal 17 a recessed transverse gutter 17F is formed which fits under the overlapping area and which discharges sideways into the vertical side member seal 18 via a transfer section 17E. The rear column seal 18 is slanted obliquely in an outward direction so that, at the same time, the side member 11 is sealed relative to the roof cassette 4.

The collected water in the seal 18 is routed down and there meets water which has been captured by the front portion 16A of the bottom side member seal and is routed into the rear lower or bottom corner of the side member seal 16B. This rear bottom corner of the side member seal, when the side member 11 is inserted, rests on an upper outer side of a molding 25, forming a seal the molding being attached to the rear column 12 and connected to the system of seals 20 and 21 which lie behind with the rear soft top seal 19. The lower side member seals 16A and 16B moreover discharge with a vertical connecting piece 16E into the rear vertical section 15D of the door seal 15. This connecting piece 16E is conically tapered so that it automatically nestles into the sealing section 15D to the bottom when the side member 11 is inserted.

Figure 2:
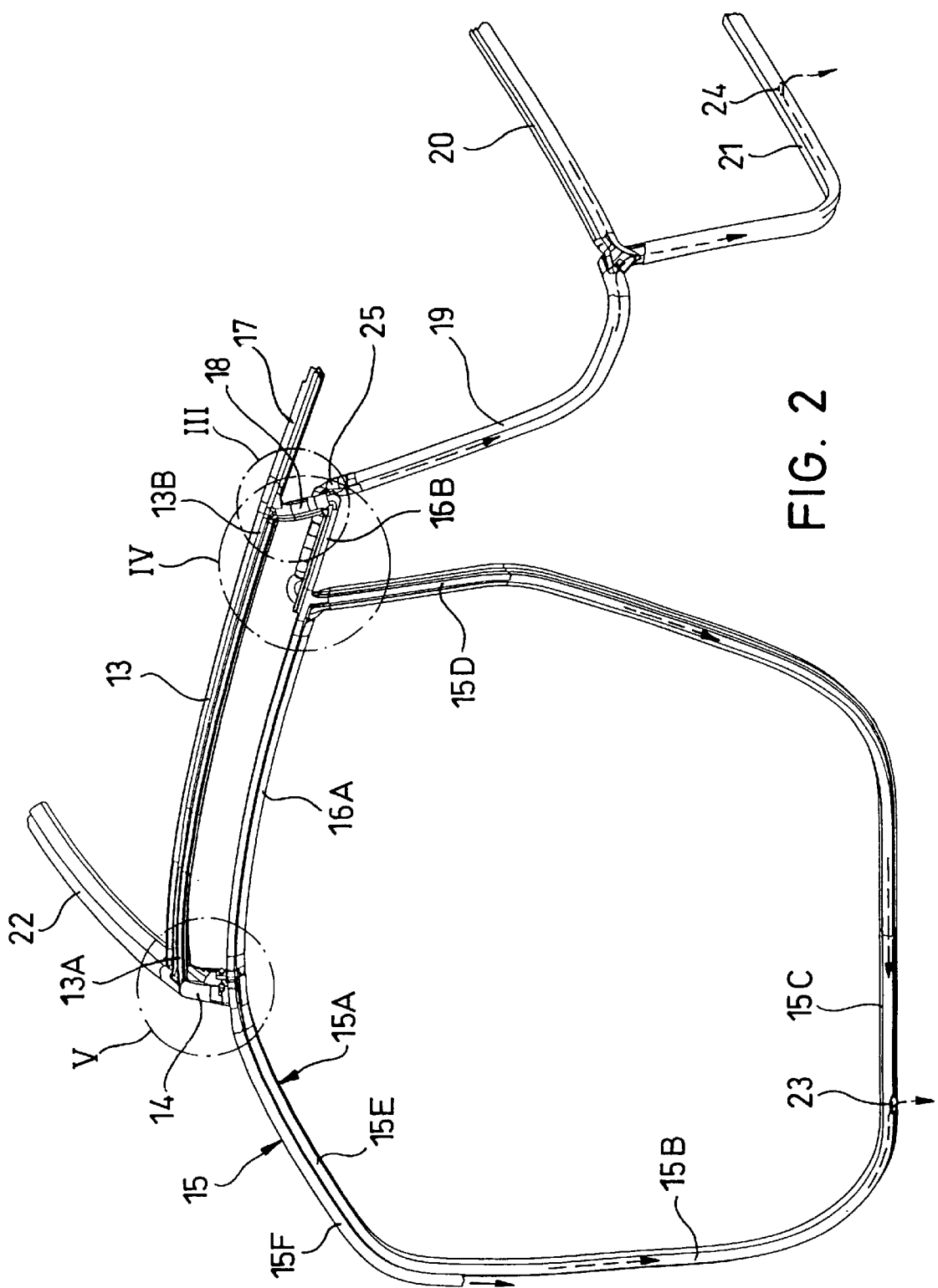
FIG. 2 is a schematic view of the sealing system for the left half of the motor vehicle.

When the front end of the side member 11 is inserted into a member bearing on the front column 10 or on the apron 2 in the front area, the top side member seal 13 in its front end section 13A fits likewise with a conical taper into the top part of the front column seal 14. At the same time, the front portion 16A of the bottom side member seal with a conically tapered section fits into the bottom part of the front column seal 14. In doing so, the primarily collected water is drained forward and obliquely down via the primary channel 15F of the door seal 15, which channel lies to the top in FIG. 2, and emerges roughly at the height of the front lower corner of the side window 7 in the door rabbet. A secondary gutter part 15E of the door seal 15 reaches under the abutting area or the overlapping area between the front portion 16A of the bottom side member seal and the lower part of the front column seal 14. Also, in turn, there is a transverse gutter there, which is not shown, analogous to the transverse gutter 17F in FIG. 3 which captures the backflow of water in the area of the primary channel 15F and drains it into the secondary gutter part 15E. Also, in the top area of the front column seal 14 into which the front end section 13A of the top side member seal 13 discharges, a corresponding transversely running gutter 14F is formed which prevents backflow of water to the seal 13 and drains it obliquely downward.

Figure 5:
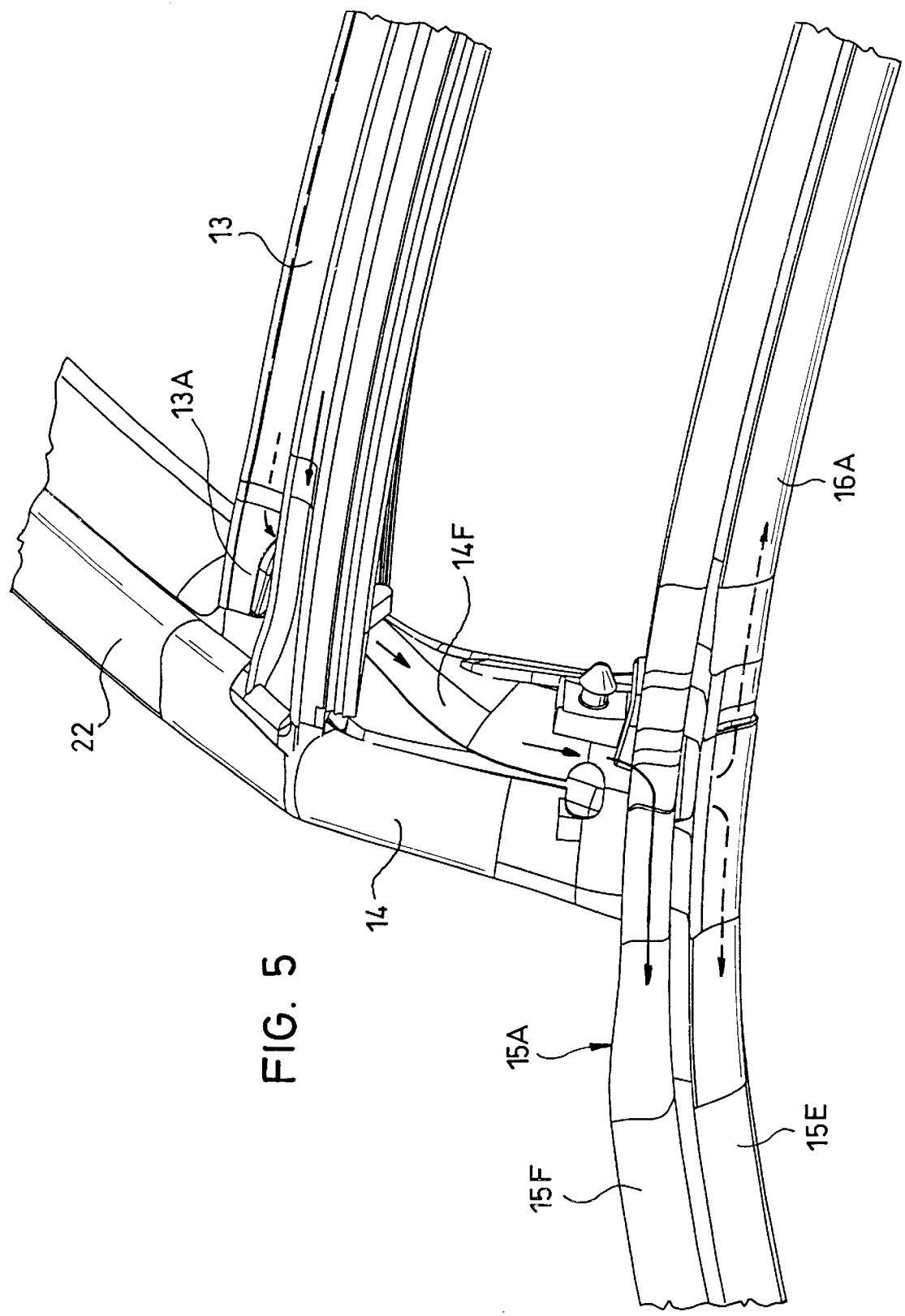
FIG. 5 is a perspective view of the transition area from the side member to the apron or the A column and from there to the door seal.

FIG. 5 shows the primary routing of the rainwater with solid arrows and the guiding of the secondary residual water with broken-line arrows. The side member 11 is inserted such that first of all the front end is inserted into a member bearing on the front column 10, a bearing which is not shown, and then the back end is seated downward on the top edge of the rear column 12 and locked. Accordingly the seals are also shaped so that the front end section 13A of the top side member seal 13 and the front portion 16A of the lower side member seal are inserted forward into the front column seal 14, while the rear end section 13B of the top side member seal 13 rests from overhead on the roof cassette seal 17, the connecting piece 16E on the overlapping area between the rear portion 16B and the front portion 16A of the lower side member seal from overhead conically discharges into the receiver of the vertical section 15D of the door seal and the rear lower corner rests and forms a seal on the molding 25 on the rear column 12 above the rear soft top seal 19.

The sealing system in accordance with the invention enables reliable sealing of a convertible motor vehicle system with roof parts which can be moved relative to one another and even removed. While the present invention has been illustrated and described in connection with what is considered the most practical and preferred embodiments, it is understood that this invention is not limited to the embodiments disclosed herein but is intended to cover various arrangements included within the spirit and scope of the broadest reasonable interpretations and equivalent arrangements.

What is claimed is:

1. A sealing system for a motor vehicle having adjacent body parts that are movable relative to one another, said sealing system comprising:

two sealing profile sections for attachment to the adjacent body parts, each of said two sealing profile sections including at least one channel for transferring water;

wherein said at least one channel at least partially overlaps an adjacent at least one channel when the adjacent body parts are interconnected to one another and is separable when the movable adjacent body parts are moved apart; and wherein said at least partial overlap is located in an area which is inclined relative to the horizontal in a direction of water flow in said channels; and wherein said at least one channel has an open cross section.

2. The sealing system as claimed in claim 1, wherein said adjacent at leas one channel has a closed cross section.

3. The sealing system as claimed in claim 1, wherein said at least one channel has a cross section where said at least one channel at least partially overlaps the adjacent at least one channel which is reduced relative to a cross section of the adjacent at least one channel.

4. The sealing system as claimed in claim 3, wherein said cross section of the adjacent at least one channel which is reduced in an end area which tapers towards an end thereof.

5. The sealing system as claimed in claim 1, wherein one of said two sealing profile sections is attached to a movable side member of said motor vehicle and an adjacent one of said two sealing profile sections is attached to an adjacent column of said motor vehicle.

6. The sealing system as claimed in claim 4, wherein said at least one channel contains a through hole located on a lowest point of said at least one channel for discharging water.

7. The sealing system as claimed in claim 1, wherein the movable adjacent body parts comprise a movable side member of said motor vehicle and an adjacent column of said motor vehicle; and wherein one of said two sealing profile sections is attached to the movable side member of said motor vehicle and an adjacent one of said two sealing profile sections is attached to the adjacent column of said motor vehicle.

8. The sealing system as claimed in claim 1, wherein the movable adjacent body parts comprise a bottom section of said motor vehicle and a door of said motor vehicle; and wherein one of said two sealing profile sections is attached to a bottom section of the movable side member of said motor vehicle and an adjacent one of said two sealing profile sections is attached to the door of the motor vehicle.

9. The sealing system as claimed in claim 1, wherein the movable adjacent body parts comprise a movable side member of said motor vehicle and a roof cassette of said motor vehicle; and wherein one of said two sealing profile sections is attached to the movable side member of said motor vehicle and an adjacent one of said two sealing profile section is attached to the roof cassette of said motor vehicle.

10. A sealing system for a motor vehicle having adjacent body parts that are movable relative to one another, said sealing system comprising:

two sealing profile sections for attachment to the adjacent body parts, each of said two sealing profile sections including at least one channel for transferring water;

wherein said at least one channel at least partially overlaps an adjacent at least one channel when the adjacent body parts are interconnected to one another and is separable when the movable adjacent body parts are moved apart; and wherein said at least partial overlap is located in an area which is inclined relative to the horizontal in a direction of water flow in said channels; and wherein the movable adjacent body parts comprise a movable side member of said motor vehicle and an adjacent column of said motor vehicle; and wherein one of said two sealing profile sections is attached to the movable side member of said motor vehicle and an adjacent one of said two sealing profile sections is attached to the adjacent column of said motor vehicle.

11. A sealing system for a motor vehicle having adjacent body parts that are movable relative to one another, said sealing system comprising:

two sealing profile sections for attachment to the adjacent body parts, each of said two sealing profile sections including at least one channel for transferring water;

wherein said at least one channel at least partially overlaps an adjacent at least one channel when the adjacent body parts are interconnected to one another and is separable when the movable adjacent body parts are moved apart; and wherein said at least partial overlap is located in an area which is inclined relative to the horizontal in a direction of water flow in said channels; and wherein the movable adjacent body parts comprise a bottom section of said motor vehicle and a door of said motor vehicle; and wherein one of said two sealing profile sections is attached to a bottom section of the movable side member of said motor vehicle and an adjacent one of said two sealing profile sections is attached to the door of the motor vehicle.

* * * * *